United States Patent [19]

De Vries

[11] Patent Number: 4,797,618
[45] Date of Patent: Jan. 10, 1989

[54] CADDY FOR METAL DETECTOR

[76] Inventor: Charles V. De Vries, 16203 Serenity St., Plainfield, Ill. 60544

[21] Appl. No.: 13,476

[22] Filed: Feb. 11, 1987

[51] Int. Cl.$^4$ ............... G01V 3/11; G01V 3/165; B62B 1/00
[52] U.S. Cl. ................... 324/326; 280/47.13 R
[58] Field of Search ................. 324/326–329, 324/345, 348, 67; 280/47.13 R, 47.15, 47.17, 47.24, 47.27

[56] References Cited

U.S. PATENT DOCUMENTS

| 2,974,276 | 3/1961 | Davis | 324/348 X |
| 3,733,086 | 5/1973 | Walkerow | 280/47.17 |
| 4,263,553 | 4/1981 | Cook et al. | 324/327 |
| 4,358,123 | 11/1982 | Richards | 280/47.24 X |
| 4,442,659 | 4/1984 | Enbusk | 280/47.24 X |
| 4,584,530 | 4/1986 | Nicholson | 324/347 X |

FOREIGN PATENT DOCUMENTS

| 717110 | 2/1942 | Fed. Rep. of Germany | 324/329 |
| 2166872 | 5/1986 | United Kingdom | 324/456 |

OTHER PUBLICATIONS

Doll et al, Vehicular-Mounted Mine Detector *Electronics* Jan. 1946, pp. 105–109.

Primary Examiner—Gerard R. Strecker
Attorney, Agent, or Firm—Hill, Van Santen, Steadman & Simpson

[57] ABSTRACT

A caddy for a metal detector comprising a completely non-metallic carrier for a portable metal detector of the type having a planar searchcoil head, an elongated rod or stem extending from the searchcoil head at one end to a handle at the opposite end, with an electronic power supply and controls at the handle end connected by a cable to the detector coils mounted in the searchcoil head. Such metal detectors are normally carried by hand. The present invention provides a caddy or cart having a pair of non-metallic wheels on a non-metallic axle supporting an elongated non-metallic connecting bar for connecting to the elongated rod or stem of the metal detector by a pair of adjustable non-metallic brackets at a desired point thereon which positions the searchcoil head of the metal detector a pre-selected distance above the ground when the handle end is grasped by a user and held at the angle which positions the planar searchcoil head substantially parallel to the ground. The wheels include marking means such as ribs to make a line marking on the ground to indicate what area has been covered. Means are provided to adjust the distance the wheels are spaced apart for use with different size searchcoil heads, the wheels being in line with the outermost opposite side edges respectively of the searchcoil head which is positioned ahead of the wheels.

18 Claims, 5 Drawing Sheets

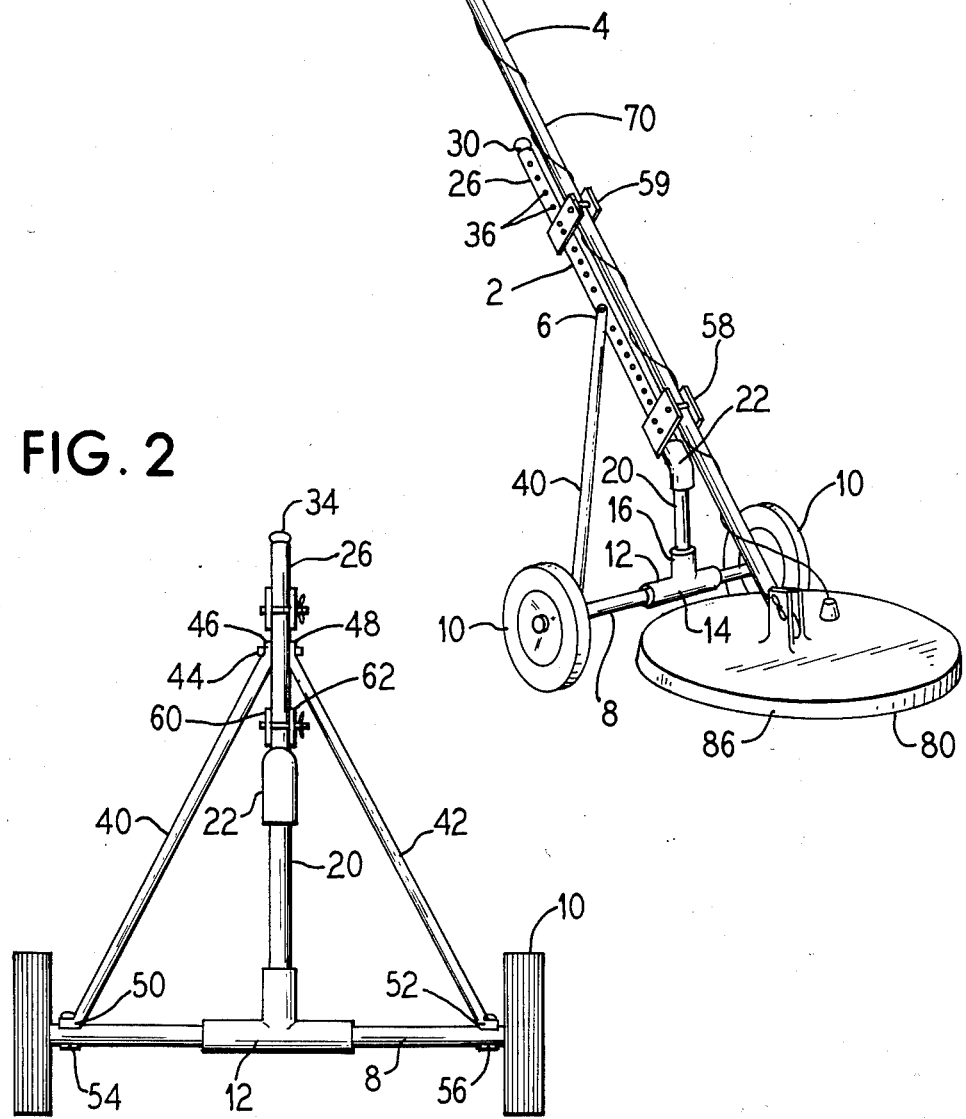

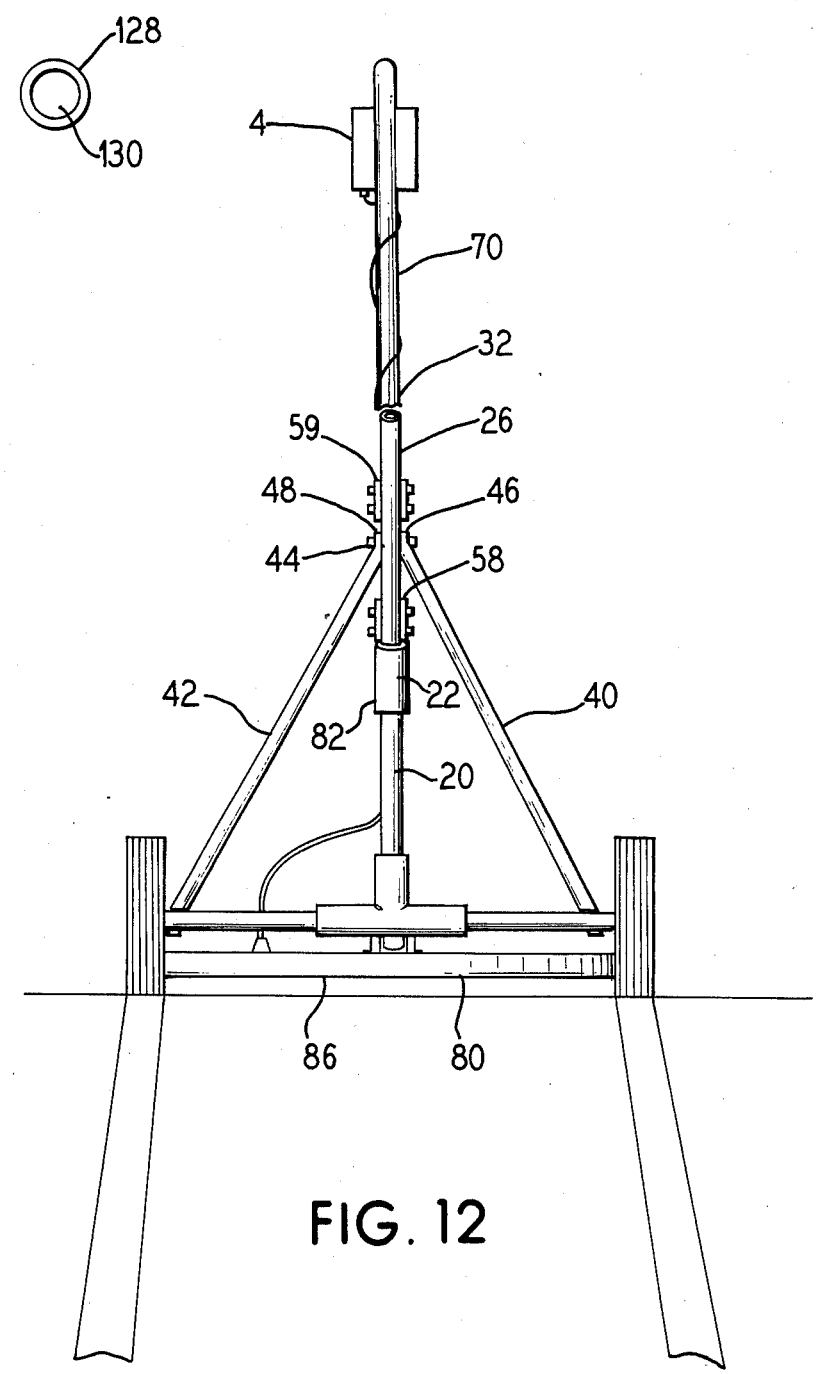

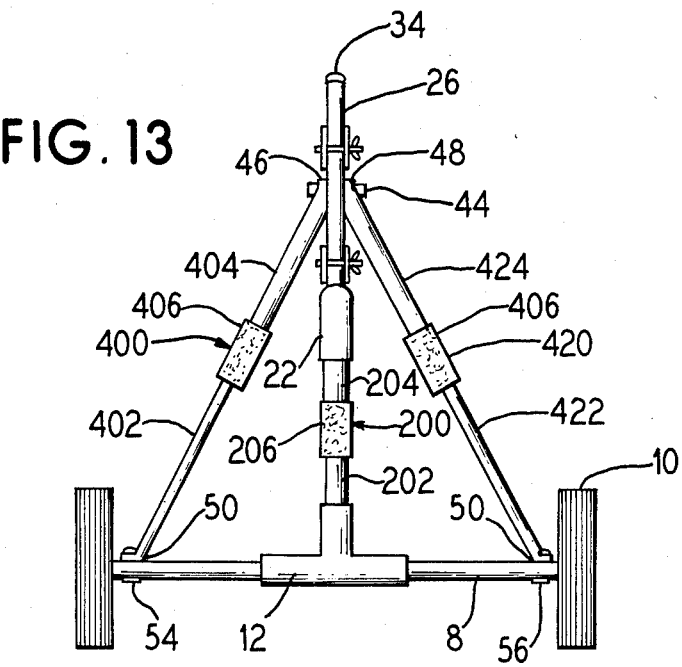
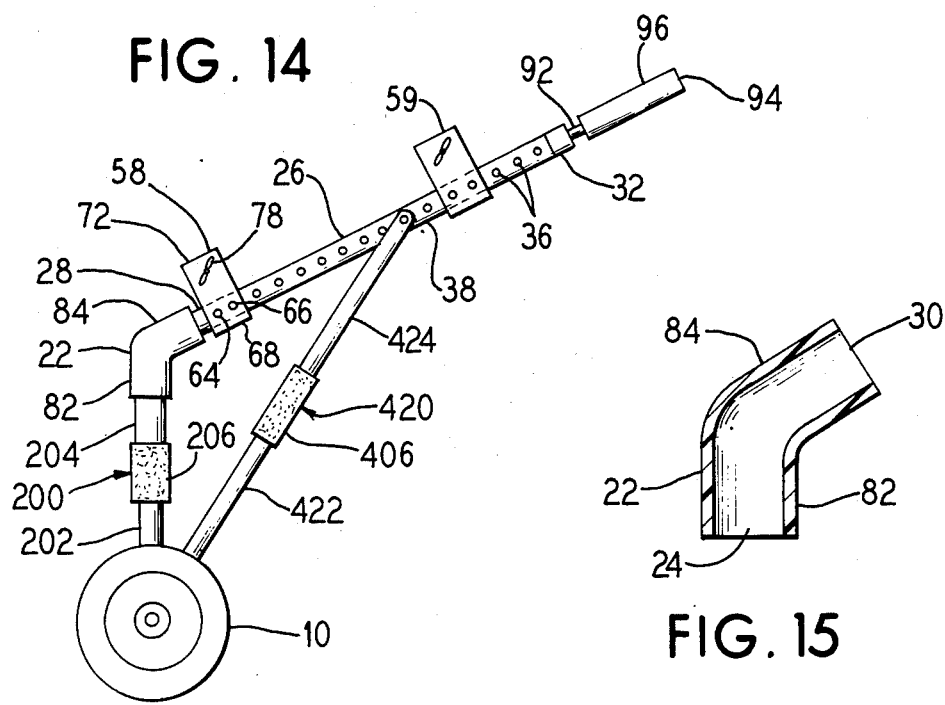

4,797,618

CADDY FOR METAL DETECTOR

BACKGROUND OF THE INVENTION

This invention relates to an auxiliary device for supporting a portable hand held metal detector in its working position to lessen the load that otherwise has to be carried by the operator.

Portable hand held metal detectors of the type having a planar searchcoil head, elongated stem with an electronic power supply and operating controls at the handle end have become popular in recent years and in widespread use to search for coins and other metal objects on or buried in the ground. Heretofore, such metal detectors have been held by the user in one hand without any supporting device to carry part of the weight. The elongated stem has to be held at an oblique angle, extending forwardly from the user, to position the planar searchcoil head a relatively short distance above the ground and preferably parallel or substantially parallel to the ground. When held in such position, the electrically energized coils in the searchcoil head pick up a signal when a metal object is located beneath the searchcoil head but if not held at the proper distance above the ground and substantially parallel to the ground a number of metal objects will be missed. Although such metal detectors are typically lightweight, carrying one at the proper angle and at the proper height above the ground can become very tiring when the user has to carry the metal detector himself without any auxiliary support.

Also, there is nothing to mark on the ground the area that has been covered when the user carries the detector himself without any auxiliary supporting device.

The caddy for a metal detector in accordance with the present invention solves those problems inherent in the prior art method described. It provides a support having wheels to both carry the weight of the metal detector and position it the proper distance above the ground as well as enable the user to maintain the planar searchcoil head in a substantially parallel relationship to the ground. In addition, the caddy in accordance with the present invention provides marking means to indicate the area of the ground which has been covered by the metal detector. The caddy is entirely non-metallic so as not to interfere with the metal detecting operation of the coils.

SUMMARY OF THE INVENTION

It is an object of the invention to provide a caddy for a metal detector comprising a non-metallic supporting frame, non-metallic adjustable brackets to secure the metal detector thereto at a desired location to position the metal detector head a pre-selected distance above the ground, said supporting frame including non-metallic wheels for rolling the caddy over the ground with the metal detector head properly positioned at the pre-selected height to most effectively detect metal objects on and buried under the ground.

It is an object of the invention to provide a caddy for a metal detector which includes marking means to mark on the ground the area which has been covered by the metal detector carried by said caddy.

It is an object of the invention to provide a caddy for a metal detector which includes adjustment means to adjustably position the searchcoil head of the metal detector in a substantially parallel relationship with the surface of the ground and a desired pre-selected distance above the surface of the ground.

It is an object of the invention to provide a caddy for a metal detector which does not need a separate handle but utilizes the handle of the metal detector itself, thereby minimizing the weight of the caddy and material needed for its construction as well as substantially preserving the original balance and weight distribution of the metal detector when used without the caddy.

It is an object of the invention to provide a caddy for a metal detector which is very durable and yet very lightweight by virtue of the limited number of parts used in its construction and the light weight of the non-metallic materials used.

BRIEF DESCRIPTION OF THE DRAWING

FIG. 1 is a perspective view of a metal detector mounted on a non-metallic caddy in accordance with this invention.

FIG. 2 is a front elevation view of a non-metallic caddy for a metal detector in accordance with this invention.

FIG. 11 is a side elevation view of a non-metallic retaining ring to hold the wheels on the axle shown in FIG. 10.

FIG. 12 is an elevation view from the rear of a caddy in accordance with this invention having a metal detector mounted thereon.

FIG. 13 is a front elevation view of a modified non-metallic caddy for a metal detector in accordance with this invention having a telescoping adjustable upright extension member and telescoping adjustable reinforcing bars to illustrate a different embodiment of adjustment means to adjust the height of the metal detector's searchcoil head above the surface of the ground.

FIG. 14 is a side elevation view of the modified caddy shown in FIG. 13.

FIG. 15 is a section view of the non-metallic angled elbow used to connect the upright extension member extending upwardly from the axle to the diagonally extending connecting bar member of the caddy for metal detectors in accordance with this invention.

DESCRIPTION OF PREFERRED EMBODIMENT

Figure 3:
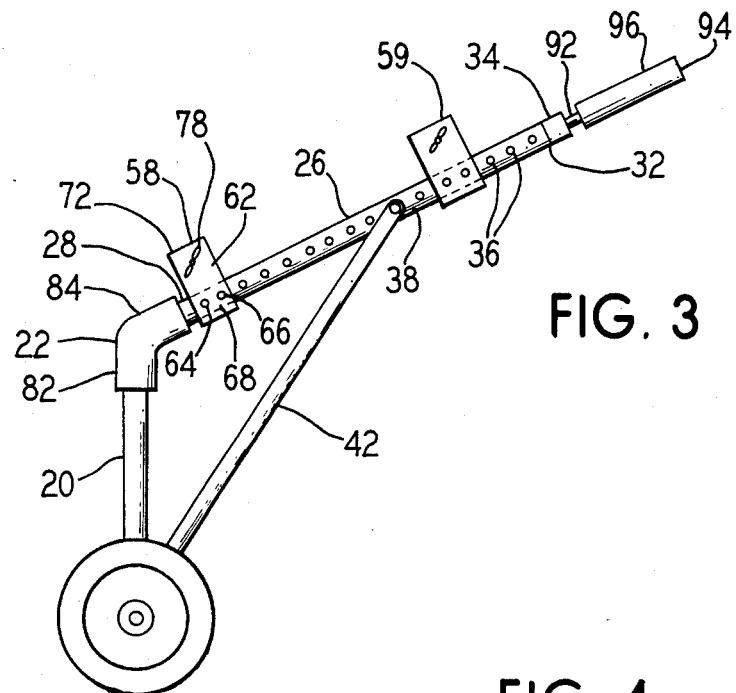
FIG. 3 is a side elevation view of a non-metallic caddy for a metal detector in accordance with this invention, including means to carry accessories showing a non-metallic coin probe carried thereon for digging metal objects buried in the ground detected by the metal detector.

A caddy 2 for a metal detector 4 in accordance with the present invention includes a supporting frame 6 carried on an axle 8 having a pair of wheels 10 mounted thereon at opposite ends thereof as illustrated in FIG. 1.

The supporting frame 6, axle 8 and wheels 10 are made of a non-metallic material such as a polyvinyl plastic material or the like which is lightweight but has structural stability and strength.

Figure 4:
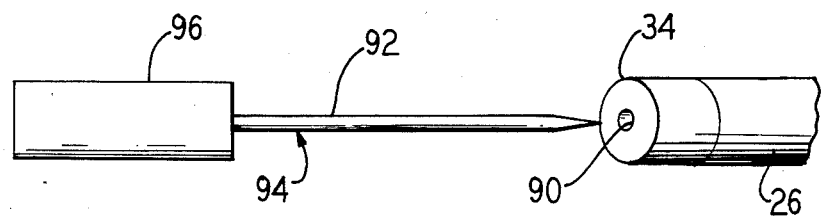
FIG. 4 is a side elevation view of a non-metallic coin probe shown in position for entry into the portion of the caddy which is provided to carry such accessory as shown in FIG. 3.
Figure 6:
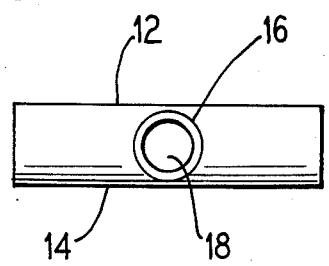
FIG. 6 is a planar view of the T-shaped connecting member for connecting an upright extension member to the axle of a caddy for metal detectors in accordance with this invention.

As shown in FIGS. 1 and 2, the supporting frame 6 includes a non-metallic tubular T-member 12, having a tubular cross piece 14 through which the axle 8 is received, the T-member 12 being positioned centrally on the axle 8. A tubular leg 16 having a socket 18 extends from the cross piece 14 (FIG. 6). A relatively short non-metallic tubular extension 20 is seated in the socket 18 at one end (FIGS. 1 and 3). An angled non-metallic tubular elbow 22 (FIG. 15) is provided having a through channel opening to one end 24 to receive the opposite end of tubular extension 20 therein. The supporting frame 6 includes an elongated non-metallic tubular connecting member 26, having its lower end 28 received in the opposite open end 30 of tubular elbow 22 (FIGS. 3 and 15). The open upper end 32 of tubular connecting member 26 is closed by a non-metallic cap 34 (FIG. 4).

The elongated connecting member 26 inludes a plurality of spaced apart apertures 36 extending through its side wall 38 to provide laterally extending through passageways which extend in a direction substantially parallel to the axle 8 (FIG. 1).

A pair of non-metallic reinforcing bars 40 and 42 extend diagonally from opposite outer end portions respectively of the axle 8 to an intermediate point of the elongated connecting member 26 where they are secured by a non-metallic bolt 44 through the flattened upper ends 46 and 48 of reinforcing bars 40 and 42 and through one of the apertures 36 of the elongated connecting member 26. The flattened lower ends 50 and 52 of reinforcing bars 40 and 42 are secured to their respective outer end portion of the axle 8 by non-metallic bolts 54 and 56 (FIG. 2).

Figure 9:
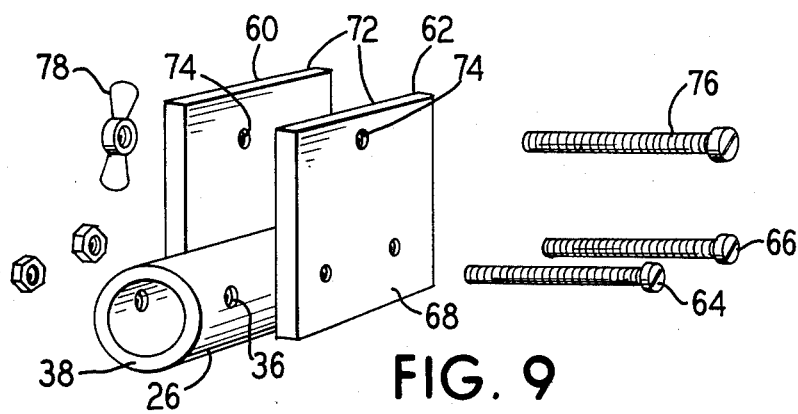
FIG. 9 is an exploded view of one of the non-metallic brackets shown in position for mounting on the connecting bar member of the caddy for metal detectors in accordance with this invention.

A first non-metallic bracket 58 as shown in detail in FIG. 9 and includes a pair of spaced apart non-metallic side walls 60 and 62 having the elongated connecting member 26 sandwiched between, secured thereto by non-metallic bolts 64 and 66 extending through the bottom edge region 68 of side walls 60 and 62 and through respective ones of the spaced apart apertures 36 through elongated connecting member 26. The side walls 60 and 62 extend outwardly from the elongated connecting member 26 a distance greater than the diameter of the elongated stem 70 of the metal detector 4, terminating at upper end 72. Apertures 74 are provided through the upper end region 72 of side walls 60 and 62 to receive non-metallic bolt 76 therethrough and adjacent the elongated stem 70 of the metal detector 4 to clamp it securely between the side walls 60 and 62 when the non-metallic wing nut 78 is tightened on bolt 76.

A second non-metallic bracket 59 is identical to the first bracket 58, and is spaced apart on the elongated connecting member 26 to secure a second spaced apart portion of the elongated stem 70 of the metal detector 4 to the connecting member 26 of the caddy 2 (FIG. 3).

The wheels 10 have an outer diameter of about six inches in a preferred embodiment of the invention, although they may be larger or smaller. The metal detector 4 is mounted on the caddy 2 at a location which places the wheels 10 behind the planar searchcoil head 80 of the metal detector 4. The angled elbow 22 has a first leg 84 in line with tubular connecting member 26 seated in open end 30, and a second leg 82 at an angle to the first leg 84 directing the tubular extension 20 seated in open end 24 of angled elbow 22 away from the tubular connecting member 26 and the elongated stem 70 of metal detector 4 connected thereto (FIGS. 3 and 15). The tubular extension 20 has a length which spaces the axle 8, connected to T-member 12 at the end of tubular extension 20, apart from the elongated stem 70 of metal detector 4 when connected to the tubular connectng member 26, in a vertical plane through axle 8 which intersects elongated stem 70 at its optimum working angle. This length will space the downwardly facing surface 86 of planar searchcoil head 80, extending from the end of elongated stem 70 in an orientation substantially parallel to the surface of the ground, at its optimum working distance apart from the surface of the ground.

The optimum working angle of elongated stem 70 is that at which the downwardly facing surface 86 of the planar searchcoil head 80 connected to the end of elongated stem 70 will be substantially parallel to the surface of the ground.

The optimum working distance of the downwardly facing surface 86 of planar searchcoil head 80 apart from the surface of the ground is variable between zero inches when "scrubbing" to four inches.

The length which tubular extension 20 positions the axle 8 and wheels 10 from elongated stem 70 when at its optimum working angle is accordingly adjustable, either by providing an adjustable telescoping tubular extension 200 (FIG. 14) having a first tubular section 202 received in a second tubular section 204 held at any desired point by rotating compression sleeve member 206 on second tubular section 204 to compress its inner wall against the outer wall of first tubular section 202 received therein, or by loosening brackets 58 and 59 (FIG. 3) to move the supporting frame 6 and its tubular extension 20 a short distance either backwardly from the searchcoil head 80 which will position its downwardly facing surface 86 closer to the surface of the ground or forwardly toward the searchcoil head 80 which will space its downwardly facing surface 86 farther apart from the surface of the ground.

When a telescoping tubular extension 200 is used to adjust and position the wheels 10 the proper distance from elongated stem 70 of the metal detector 4, telescoping reinforcing bars 400 and 420 are also provided having first tubular sections 402 and 422 respectively received in second tubular sections 404 and 424 respectively so they may slide as necessary to permit sliding adjustment of telescoping tubular extension 200 (FIGS. 13 and 14). Rotating compression sleeve members 406 and 426 are provided on second tubular sections 404 and 424 respectively to compress the inner walls thereof against the respective outer walls of first tubular sections 404 and 422 received therein to hold the telescoping reinforcing bars 400 and 420 at whatever adjusted position selected.

The non-metallic cap 34 (FIG. 4) which closes the open upper end 32 of tubular connecting member 26 may include an aperture 90 to receive the non-metallic elongated shaft 92 of a non-metallic coin probe 94, having a non-metallic handle 96, for convenient storage in the caddy 2. One of the common uses of the metal detector 4 is to search for coins and other metal objects of value which may have become buried below the surface of the earth. A probe to dig and unearth such objects is a needed item of equipment, and the caddy in accordance wtih this invention provides a compartment within tubular connecting member 26 and its apertured cap 34 provides a holder to receive and hold such probe 94.

Figure 5:
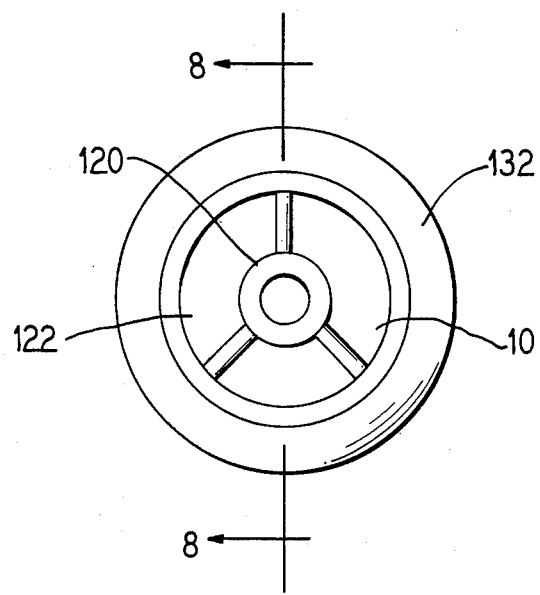
FIG. 5 is a side elevation view of one of the non-metallic wheels of the metal detector caddy in accordance with this invention.
Figure 8:
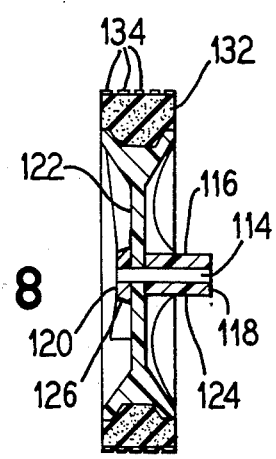
FIG. 8 is a section view taken on line 8—8 of FIG. 5.
Figure 10:
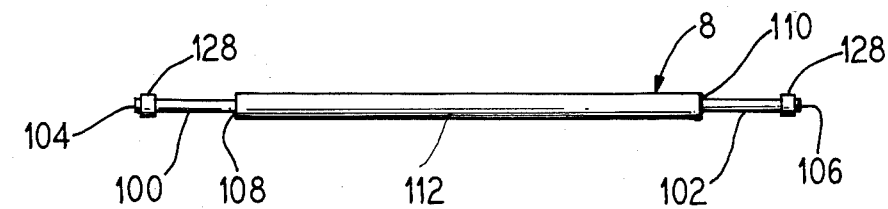
FIG. 10 is a side elevation view of the non-metallic axle for use in the caddy for metal detectors in accordance with this invention.

The non-metallic axle 8 includes slightly reduced diameter portions 100 and 102 (FIG. 10) extending inwardly from each opposite end 104 and 106, terminating at annular bearing shoulders 108 and 110 formed at each opposite end of the larger diameter intermediate portion 112 of axle 8. The diameter of the bore 114 (FIG. 8) through the hub 116 of wheels 10 corresponds to the diameter of the slightly reduced diameter portions 100 and 102 of axle 8, the outer annular wall surfaces 118 and 120 (FIGS. 5 and 8) of hub 116 on opposite sides of each wheel 10 being provided to bear against the annular bearing shoulders 108 and 110 when mounted on axle 8. The wheels 10 may be mounted on axle 8 in such a way that either annular wall surfaces 118 or 120 face the respective bearing shoulders 108 and 110, depending on whether a relatively narrower spacing of wheels 10 is desired or a relatively wider spacing.

The annular hub 116 of each wheel 10 extends axially outwardly from the radially extending disc portion 122 of each wheel 10 a greater distance on one side than on the other, providing an axially elongated hub section 124 extending axially outwardly from one side and an axially shortened hub section 126 extending axially outwardly from the opposite side. The axially elongated hub section 124 terminates at annular wall surface 118 and the axially shortened hub section 126 terminates at annular wall surface 120. Thus, when a relatively narrower spacing of wheels 10 is desired, they are mounted on reduced diameter portions 100 and 102 of axle 8 with annular wall surfaces 120 of each wheel facing and bearing against respective ones of the annular bearing shoulders 108 and 110. When a relatively wider spacing of wheels 10 is desired, they are reversed and mounted on reduced diameter portions of axle 8 with annular wall surfaces 118 of each wheel facing and bearing against respective ones of the annular bearing shoulders 108 and 110.

The reduced diameter portions 100 and 102 of axle 8 extend slightly beyond the outer edges of the hubs 116 when wheels 10 are mounted thereon, and non-metallic retaining rings 128 (FIGS. 10 and 11) are provided having a bore diameter 130 corresponding to the diameter of reduced diameter portions 100 and 102 for a tight press fit thereon to hold the wheels 10 in place on the axle 8. The retaining rings 128 are made of slightly elastic, slightly stretchable plastic material and are removable from the axle portions 100 and 102 by applying sufficient prying and twisting forces. Other means already known to the prior art may be used to removably retain the wheels on the axle 8, provided they are completely non-metallic.

Figure 7:
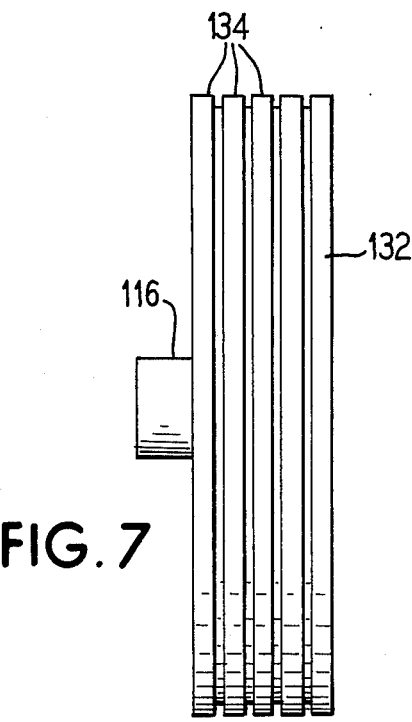
FIG. 7 is a front elevation view of the non-metallic wheel shown in FIG. 5.

The wheels 10 include tires 132 (FIGS. 7) having a plurality of circumferential ribs 134 extending around the circumference of the tire 132, each rib 134 being spaced apart from the adjacent one, such ribs 134 making marks on the ground as the caddy 2 and metal detector 4 carried thereon is rolled across the ground (FIG. 12). The user can thereby see such markings to tell which area has been covered. The width the wheels 10 are spaced apart corresponds to the width of the searchcoil head 80, and the wheels 10 are positioned to track behind respective opposite outer edges of the searchcoil head 80. The space between the marks left by the wheels 10 has therefore been covered by the metal detector.

I claim:

1. A caddy for metal detectors of the type having an elongated stem with a handle at one end for holding by a user and having a searchcoil head at the opposite end extending angularly from the elongated stem to be positioned substantially parallel to the surface of the ground when the elongated stem is held at a diagonal to the ground, wherein said caddy includes a supporting frame to engage and support said elongated stem of said metal detector at a diagonal to the ground and said searchcoil head positioned substantially parallel to and above the surface of the ground, transport means mounted on said supporting frame to move said caddy and metal detector supported thereon across the ground, said supporting frame comprising a connecting member for connection to said elongated stem of said metal detector and coupling means to couple said connecting member to said transport means, and adjustment means including variation means, forming a part of said coupling means, to vary the distance between said connecting member and said transport means to adjust the height of said searchcoil head above the surface of the ground to a preselected height.

2. A caddy for metal detectors as set forth in claim 1, wherein said coupling means includes an elongated bifurcated member comprising a first elongated section and a second elongated section, each having respective oppositely facing remote ends, said adjustment means varying the distance said remote ends of said first and second sections are spaced apart.

3. A caddy for metal detectors as set forth in claim 2, wherein said coupling means includes a first telescoping member comprising a first section having a cavity therein, a second section slidably receivable in and movable out of said cavity, and holding means to hold said first section relative to said section, said adjustment means and variation means thereof including said first telescoping member, one of said first and second sections thereof being connected to said connecting member and the other being connected to said transport means, whereby said distance between said connecting member and said transport means is varied as said second section is moved inwardly and outwardly of said cavity of said first section.

4. A caddy for metal detectors as set forth in claim 2, wherein said coupling means includes a first telescoping member comprising a first section having a cavity therein, a second section slidably receivable in and movable out of said cavity, and holding means to hold said first section relative to said second section, a first telescoping reinforcing bar and a second telescoping reinforcing bar, each having one section slidably receivable in and movable out of the other, said adjustment means and variation means thereof including said first telescoping member, one of said first and second sections thereof being connected to said connecting member and the other being connected to said transport means, also including said first and second telescoping reinforcing bars, one of said sections of said first telescoping bar being connected to said connecting member and the other being connected to said transport means, one of said sections of said second telescoping reinforcing bar being connected to said connecting member and the other being connected to said transport means, whereby said distance between said connecting member and said transport means is varied as said telescoping sections of said first telescoping member and of said first and second telescoping reinforcing bars receivable in and movable out of the other of said telescoping sections thereof are moved inwardly and outwardly of the other of said telescoping sections.

5. A caddy for metal detectors of the type having an elongated stem with a handle at one end for holding by a user and having a searchcoil head at the opposite end extending angularly from the elongated stem to be positioned substantially parallel to the surface of the ground when the elongated stem is held at the diagonal to the ground, wherein said caddy includes a supporting frame including an elongated tubular connecting member for connection to said elongated stem of said metal detector to engage and support said elongated stem of said metal detector at a diagonal to the ground and said searchcoil head positioned substantially parallel to and above the surface of the ground, transport means for coupling to said supporting frame to move said caddy and metal detector supported thereon across the ground, coupling means to couple said connecting member to said transport means, and adjustment means mounted on said connecting member and slidingly engaging said stem to adjust the height of said searchcoil head above the surface of the ground to a pre-selected height, said adjustment means comprising a first bracket connected to said tubular connecting member having a first side wall on one side of said tubular connecting member, a second side wall on the opposite side of said tubular connecting member, said first and second side walls extending upwardly and outwardly from said elongated tubular connecting member a distance greater than the diameter of said elongated stem of said metal detector, an aperture through said first and second side walls of said first bracket, and a retaining bolt through said apertures of said first and second side walls of said first bracket to clamp and retain said elongated stem of said metal detector between said first and second side walls of said first bracket when in place therebetween.

6. A caddy for metal detectors as set forth in claim 5, including a second bracket connected to said tubular connecting member in spaced apart relationship to said first bracket.

7. A caddy for metal detectors as set forth in claim 6, wherein said elongated tubular connecting member when connected to said elongaged stem of said metal detector terminates at an intermediate location point of said elongated stem and short of said one end thereof at which said handle is located, said spaced apart first and second brackets holding said tubular connecting member in fixed parallel relationship with said elongated stem of said metal detector whereby said handle of said metal detector can be used to direct the movement of said caddy on its said transport means.

8. A caddy for metal detectors as set forth in claim 7, wherein said elongated tubular connecting member terminates at an open end facing toward said handle end of said metal detector stem and opening to a cavity extending into said elongated tubular connecting member, a closure cap on said open end, an aperture through said closure cap to receive the shank of a tool to probe for metal objects detected below the surface of the ground by said metal detector, including said tool to probe for metal objects having said shank, said tool having a handle extending outwardly from said shank when said shank is received through said aperture into said cavity of said tubular connecting member.

9. A caddy for metal detectors of the type having an elongated stem with a handle at one end for holding by a user and having a searchcoil head at the opposite end extending angularly from the elongated stem to be positioned substantially parallel to the surface of the ground when the elongated stem is held at a diagonal to the ground, wherein said caddy includes a supporting frame including an elongated connecting member with adjustable attachment means for connection to said elongated stem of said metal detector to support said elongated stem of said metal detector at a diagonal to the ground and said searchcoil head positioned substantially parallel to and above the surface of the ground, transport means to move said caddy and metal detector supported thereon across the ground, an extension member extending from said elongated connecting member at an oblique angle to said transport means for connection thereto, said transport means including an axle, said extension member being connected to said axle, and a wheel mounted on each opposite end of said axle and said attachment means mounted on said connecting member being adjustable to adjust the height of said searchcoil head above the surface of the ground to a pre-selected height.

10. A caddy for metal detectors as set forth in claim 9, wherein each of said wheels includes marking means to mark on the ground the area traversed by said wheel, said wheels being located behind said searchcoil head of said metal detector when it is mounted on said caddy, said wheels being spread apart a distance corresponding to the lateral dimension of said searchcoil head and positioned whereby one of said wheels is substantially in line with the outermost lateral edge of said searchcoil head on one side and the other of said wheels is substantially in line with the outermost lateral edge of said searchcoil head on the opposite side thereof.

11. A caddy for metal detectors as set forth in claim 10, wherein said wheels are reversible on said axle to provide a narrower spaced apart dimension when in one position and a wider spaced apart dimension when in the reversed position, each of said wheels including a circumferential contact surface for contact with the ground, a centrally located hub having a bore extending axially therethrough to receive said axle, said hub extending axially from said wheel farther on one side than on the other, said hub terminating at an annular bearing surface at each opposite end, said wheels being spaced farther apart when said portions of said hub which extend axially the farthest from said wheels are placed on said axle facing each other, said wheels being spaced apart a lesser distance when they are reversed on said axle with the portions of said hub which extend axially the least from said wheels placed on said axle facing each other.

12. A caddy for metal detectors as set forth in claim 11, wherein said axle includes a first reduced diameter portion extending inwardly from a first end of said axle to terminate at a first annular shoulder extending normal to the axis of said axle, a second reduced diameter portion extending inwardly from the opposite second end of said axle to terminate at a second annular shoulder extending normal to the axis of said axle, including said first and second annular shoulders, respective ones of said annular bearing surfaces of said hub of said wheels bearing against respective ones of said first and second annular shoulders when said wheels are mounted on said axle, a pair of slightly stretchable retaining rings for mounting on the outer edge region of respective ones of said first and second reduced diameter portions of said axle after said wheels have been mounted thereon to retain said wheels on said axle, said slightly stretchable retaining rings being stretchably and grippingly mounted on the outer edge regions of respective ones of said first and second reduced diameter portions of said axle to retain said wheels thereon, said retaining rings being stretchable and removable from said axle to permit reversal of said wheels thereon.

13. A caddy for metal detectors as set forth in claim 9, wherein said attachment means is adjustable relative to said elongated stem to support said searchcoil head of said metal detector on said caddy above the surface of the ground between a pre-selected height of 0" to 4".

14. A caddy for metal detectors as set forth in claim 9, including said metal detector.

15. A caddy for metal detectors as set forth in claim 9, wherein said caddy including said supporting frame, said transport means and said attachment means are entirely non-metallic.

16. A caddy for metal detectors of the type having an elongaged stem with a handle at one end for holding by a user and having a searchcoil head at the opposite end extending angularly from the elonagated stem to be positioned substantially parallel to the surface of the ground when the elongated stem is held at a diagonal to the ground, wherein said caddy includes a support frame including an elongated connecting member with attachment means to engage and support said elongated stem at a diagonal to the ground and said searchcoil head positioned substantially parallel to an above surface of the ground, transport means mounted on said support frame to move said caddy and metal detector supported thereon across the ground, said attachment means comprising a plurality of independently adjustable clamping means carried on said elongated connecting member of said support frame clampingly engageable with said elongated stem of said metal detector at spaced locations along the length thereof to adjust the height of said searchcoil head above the surface of the ground to a pre-selected height.

17. A caddy for metal detectors according to claim 16, wherein said plurality of independently adjustable clamping means comprise spaced threaded fasteners extending between opposed clamping walls carried on said supporting frame engageable with said elongated stem, tightening of said fasteners serving to clamp said walls against said elongated stem.

18. A caddy for metal detectors according to claim 17, wherein said clamping means further comprises a plurality of spaced sets of opposed clamping walls.

* * * * *